(12) United States Patent
Hunt et al.

(10) Patent No.: US 11,533,851 B2
(45) Date of Patent: Dec. 27, 2022

(54) REEL ASSEMBLY FOR AN AGRICULTURAL HEADER

(71) Applicant: CNH Industrial America LLC, New Holland, PA (US)

(72) Inventors: Cory Douglas Hunt, Millersville, PA (US); Herbert M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 421 days.

(21) Appl. No.: 16/724,720

(22) Filed: Dec. 23, 2019

(65) Prior Publication Data
US 2021/0185876 A1 Jun. 24, 2021

(51) Int. Cl.
*A01D 75/00* (2006.01)
*A01D 57/02* (2006.01)
*A01D 41/14* (2006.01)

(52) U.S. Cl.
CPC ........... *A01D 57/02* (2013.01); *A01D 41/141* (2013.01); *A01D 75/00* (2013.01)

(58) Field of Classification Search
CPC ...... A01D 41/141; A01D 41/14; A01D 41/12; A01D 57/02; A01D 47/00; A01D 75/00; A01D 75/008; A01D 75/185
See application file for complete search history.

(56) References Cited

U.S. PATENT DOCUMENTS

| | | | |
|---|---|---|---|
| 4,126,984 A | 11/1978 | Gail | |
| 4,507,910 A * | 4/1985 | Thornley | A01D 57/00 56/DIG. 15 |
| 5,155,983 A | 10/1992 | Sheehan et al. | |
| 5,155,984 A | 10/1992 | Sheehan | |
| 6,397,569 B1 | 6/2002 | Homburg et al. | |
| 6,791,488 B2 | 9/2004 | Dickhans et al. | |
| 6,826,894 B2 | 12/2004 | Thiemann et al. | |
| 8,381,502 B2 | 2/2013 | Dunn | |
| 8,452,501 B1 | 5/2013 | Lange et al. | |
| 8,843,283 B2 | 9/2014 | Strelioff et al. | |
| 9,585,309 B2* | 3/2017 | Posselius | A01D 47/00 |
| 9,807,933 B2* | 11/2017 | Boyd | A01D 41/127 |
| 9,807,938 B2 | 11/2017 | Wilken et al. | |

(Continued)

FOREIGN PATENT DOCUMENTS

| DE | 2411153 A1 | 9/1975 |
|---|---|---|
| GB | 2173309 A | 10/1986 |

OTHER PUBLICATIONS

International Search Report for PCT Application No. PCT/US2020/064277, dated Jul. 8, 2021, 5 pgs.

(Continued)

*Primary Examiner* — Adam J Behrens
(74) *Attorney, Agent, or Firm* — Peter Zacharias; Patrick Sheldrake

(57) ABSTRACT

A reel assembly for an agricultural header includes a reel arm configured to rotatably couple to a frame of the agricultural header and configured to support a reel of the reel assembly. The reel assembly also includes a bracket extending from the reel arm and configured to support a device. The reel assembly further includes a cable assembly configured to maintain an orientation between the device and the frame of the agricultural header as the reel arm rotates relative to the frame of the agricultural header.

17 Claims, 11 Drawing Sheets

(56) References Cited

U.S. PATENT DOCUMENTS

| | | | |
|---|---|---|---|
| 10,117,374 B2 | 11/2018 | Boydens et al. | |
| 2003/0184747 A1* | 10/2003 | Diekhans | A01D 41/127 |
| | | | 342/123 |
| 2004/0006958 A1* | 1/2004 | Thiemann | A01D 41/141 |
| | | | 56/10.2 R |
| 2013/0345937 A1* | 12/2013 | Strelioff | A01D 41/141 |
| | | | 701/50 |
| 2015/0305238 A1 | 10/2015 | Klausmann et al. | |
| 2016/0106038 A1* | 4/2016 | Boyd | A01D 34/006 |
| | | | 56/10.2 J |
| 2017/0013777 A1* | 1/2017 | Posselius | A01D 41/141 |
| 2017/0303470 A1 | 10/2017 | Briquet-Kerestedjian et al. | |
| 2019/0021226 A1* | 1/2019 | Dima | A01D 34/006 |
| 2019/0261560 A1* | 8/2019 | Jelenkovic | G06T 7/0004 |
| 2019/0307070 A1* | 10/2019 | Dima | A01D 41/141 |
| 2020/0031270 A1* | 1/2020 | Beschorn | A01D 75/00 |
| 2020/0068804 A1* | 3/2020 | Barther | G06T 7/74 |
| 2021/0015040 A1* | 1/2021 | Neitemeier | A01D 61/008 |
| 2021/0137006 A1* | 5/2021 | Shearer | A01D 75/182 |
| 2021/0185876 A1 | 6/2021 | Hunt et al. | |
| 2021/0185916 A1 | 6/2021 | Hunt | |
| 2022/0039316 A1* | 2/2022 | Seidel | A01D 41/12 |

OTHER PUBLICATIONS

Header Height Control for Grain from Headsight, accessed Jul. 18, 2022, 5 pgs., Headsight Harvesting Solutions.

"Terrahawk Horizon—Horizon Manual 09062203a", 2018, 38 pages, Headsight Harvesting Solutions.

\* cited by examiner

US 11,533,851 B2

REEL ASSEMBLY FOR AN AGRICULTURAL HEADER

BACKGROUND

The present disclosure relates generally to a reel assembly for an agricultural header.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester.

Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

Certain headers may also include a reel assembly, which may include a reel having multiple fingers extending from a central framework. The central framework is driven to rotate, such that the fingers move in a circular pattern. The fingers are configured to engage the crops, thereby preparing the crops to be cut by the cutter bar assembly and/or urging the cut crops to move toward the belt(s). The reel is typically supported by multiple arms extending from a frame of the header. The reel assembly may include one or more actuators configured to drive the arms to rotate, thereby adjusting the position of the reel relative to the frame of the header.

BRIEF DESCRIPTION

In one embodiment, a reel assembly for an agricultural header includes a reel arm configured to rotatably couple to a frame of the agricultural header and configured to support a reel of the reel assembly. The reel assembly also includes a bracket extending from the reel arm and configured to support a device. The reel assembly further includes a cable assembly configured to maintain an orientation between the device and the frame of the agricultural header as the reel arm rotates relative to the frame of the agricultural header.

In one embodiment, an assembly for an agricultural header includes a bracket configured to extend from a reel arm of an agricultural header. The assembly also includes a device coupled to the bracket, wherein the device is configured to emit electromagnetic waves to facilitate monitoring a terrain feature forward of a cutter bar assembly of the agricultural header. The device further includes a cable assembly that is configured to maintain an orientation between the device and a frame of the agricultural header as the reel arm moves relative to the frame of the agricultural header.

In one embodiment, a header for an agricultural harvester includes a cutter bar assembly coupled to a frame of the agricultural header and is configured to cut crops as the agricultural harvester travels through a field. The header also includes a reel arm coupled to the frame of the agricultural header and is configured to support a reel of the reel assembly that rotates to prepare the crops to be cut by the cutter bar assembly as the agricultural harvester travels through the field. The header further includes a bracket coupled to the reel arm and configured to support a sensor that is configured to detect terrain features as the agricultural harvester travels through the field, and a cable assembly that is configured to maintain an orientation between the sensor and the frame of the agricultural header as the reel arm moves relative to the frame of the agricultural header.

DRAWINGS

These and other features, aspects, and advantages of the present disclosure will become better understood when the following detailed description is read with reference to the accompanying drawings in which like characters represent like parts throughout the drawings, wherein.

Figure 2:
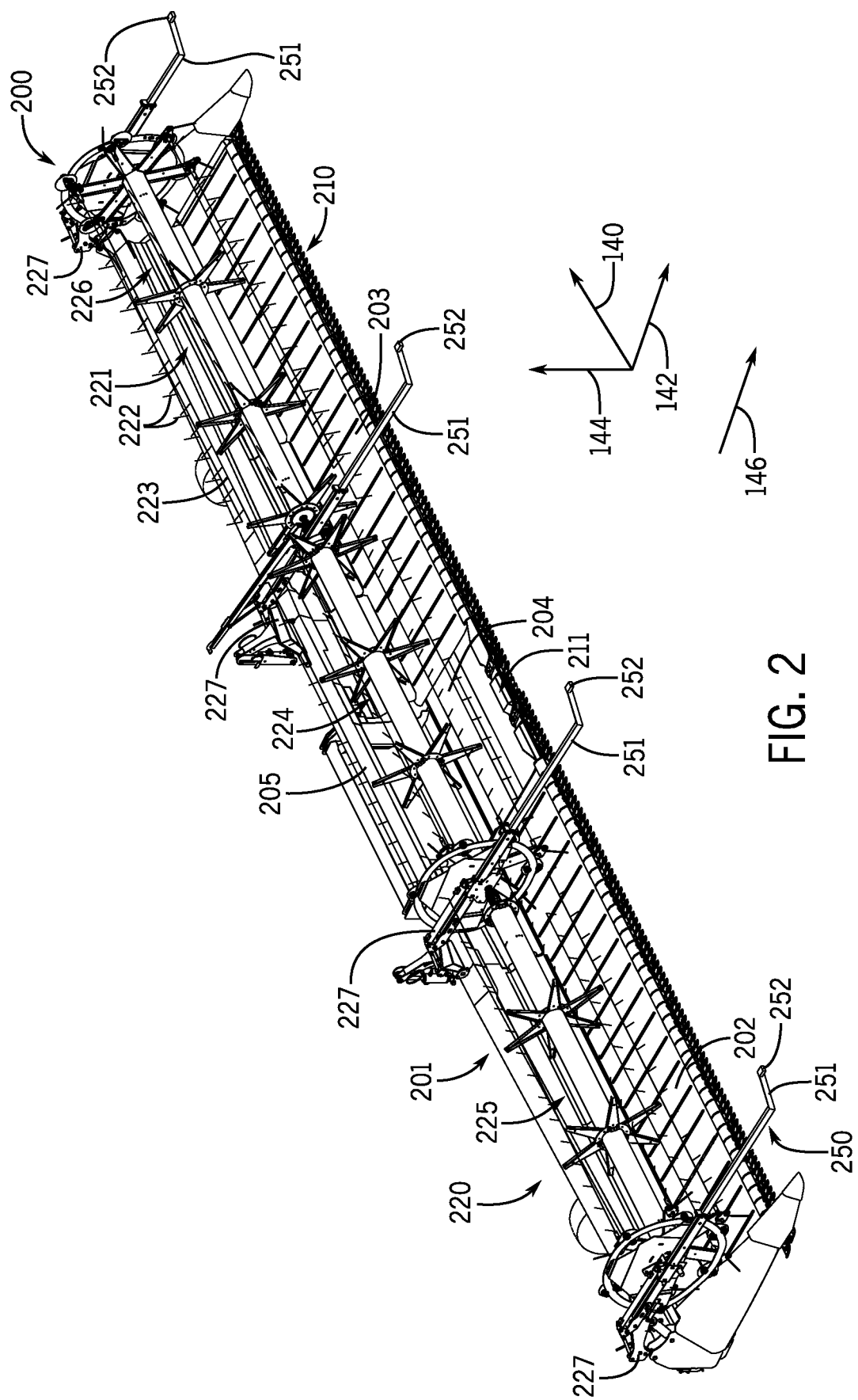
FIG. 2 is a perspective view of a header that may be employed within the harvester of FIG. 1, in accordance with embodiments of the present disclosure.
Figure 10:
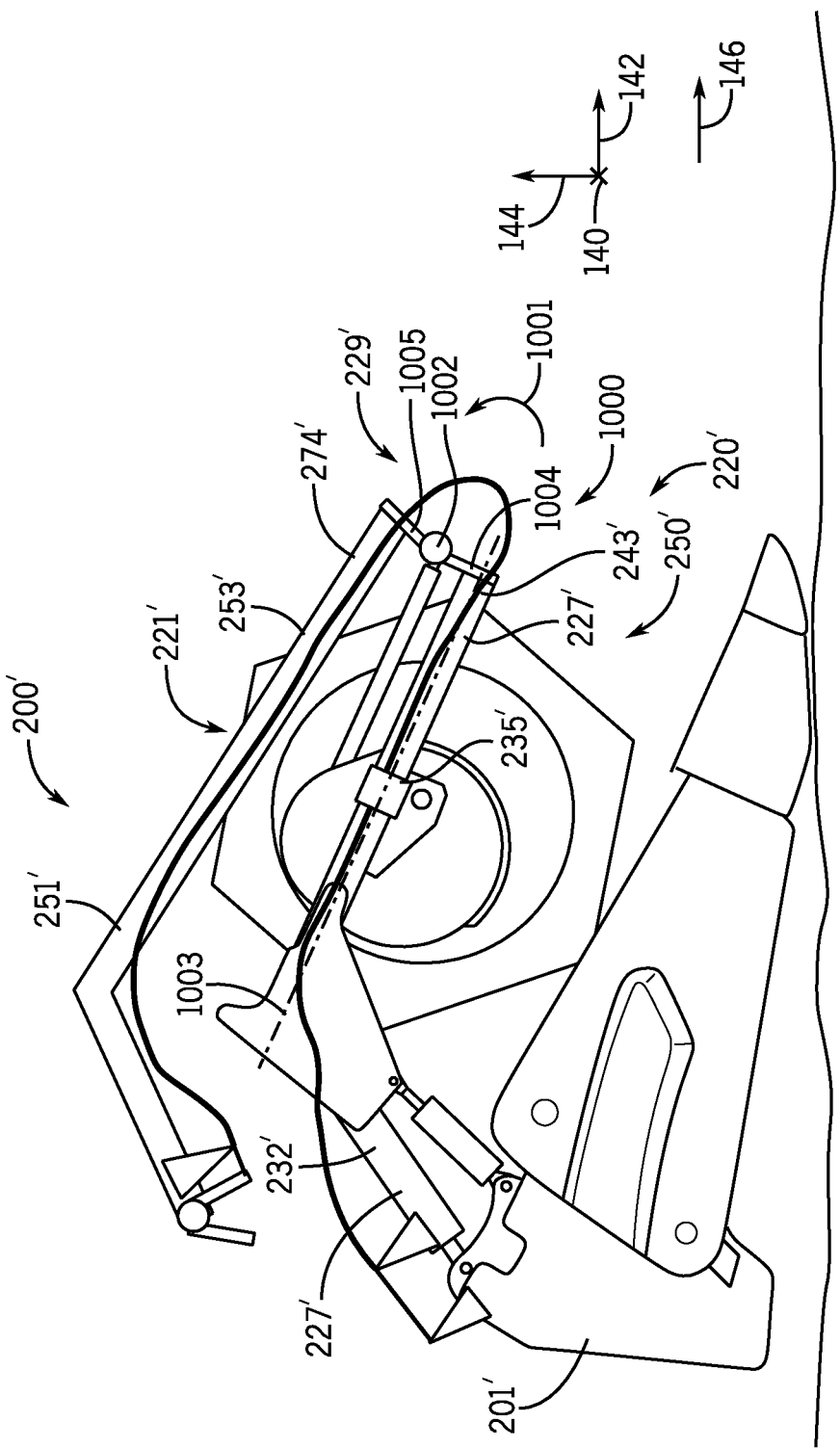
Figure 11:
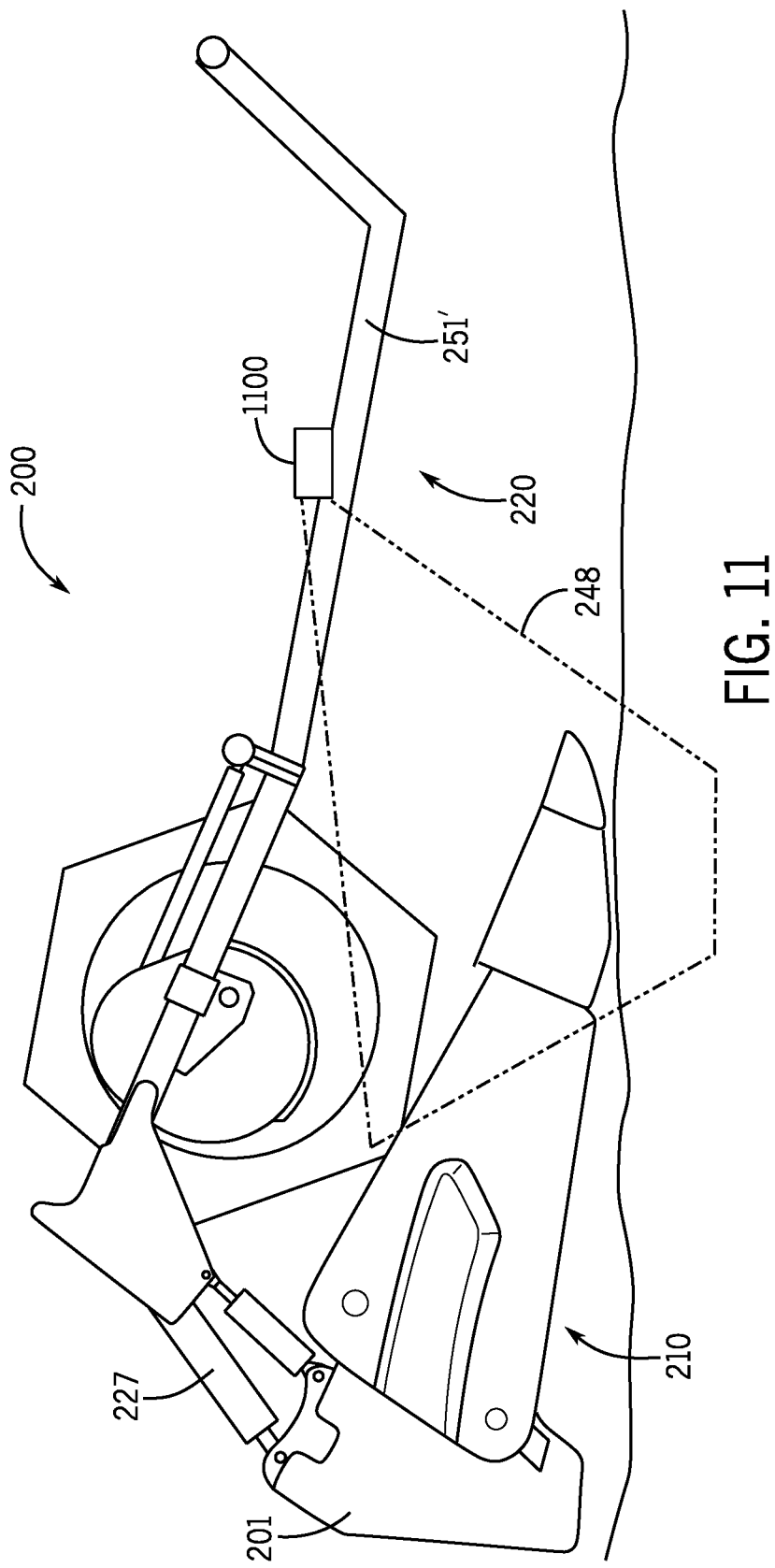

FIG. 10 is a side view of a portion of the header of FIG. 2, in which a reel assembly having a device assembly is in a more compact storage position, in accordance with embodiments of the present disclosure; and FIG. 11 is a side view of a portion of the header of FIG. 2, in which a reel assembly includes a light source mounted on the reel assembly, in accordance with embodiments of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
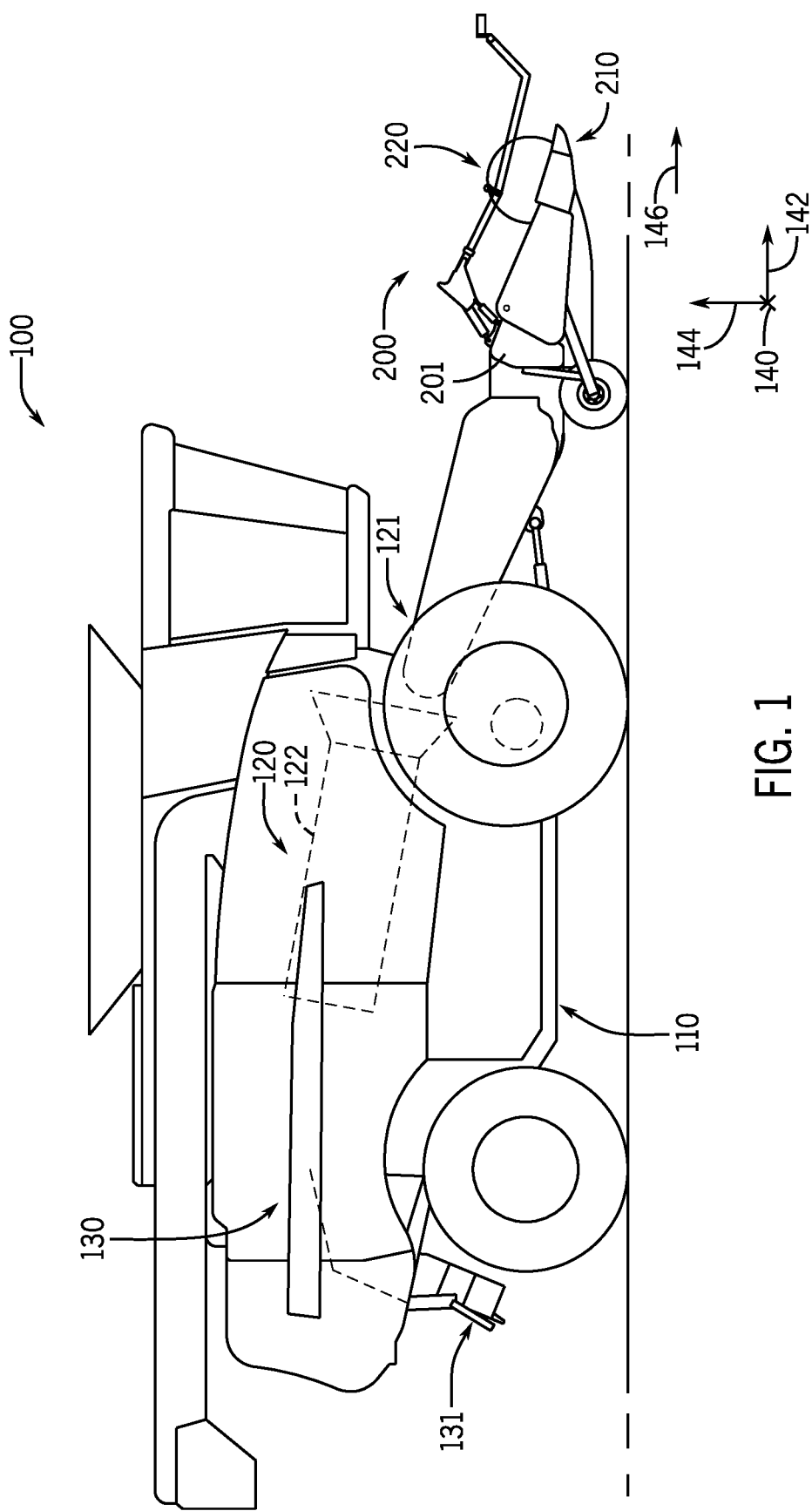
FIG. 1 is a side view of a harvester, in accordance with embodiments of the present disclosure.

Turning to the drawings, FIG. 1 is a side view of an embodiment of a harvester 100 (e.g., agricultural harvester) having a header 200 (e.g., agricultural header). The harvester 100 includes a chassis 110 configured to support the header 200 and an agricultural crop processing system 120. As described in greater detail below, the header 200 is configured to cut crops and to transport the cut crops toward an inlet 121 of the agricultural crop processing system 120 for further processing of the cut crops. The agricultural crop processing system 120 receives cut crops from the header 200 and separates desired crop material from crop residue. For example, the agricultural crop processing system 120 may include a thresher 122 having a cylindrical threshing rotor that transports the crops in a helical flow path through the harvester 100. In addition to transporting the crops, the thresher 122 may separate certain desired crop material (e.g., grain) from the crop residue (e.g., husks and pods) and may enable the desired crop material to flow into a cleaning system located beneath the thresher 122. The cleaning system may remove debris from the desired crop material and transport the desired crop material to a storage compartment within the harvester 100. The crop residue may be transported from the thresher 122 to a crop residue handling system 130, which may remove the crop residue from the harvester 100 via a crop residue spreading system 131 positioned at the aft end of the harvester 100. To facilitate discussion, the harvester 100 and/or its components may be described with reference to a lateral axis or direction 140, a longitudinal axis or direction 142, and a vertical axis or direction 144. The harvester 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto belts that convey the cut crops toward the inlet 121 of the agricultural crop processing system 120. As discussed in detail below, the reel assembly 220 includes a reel having multiple fingers extending from a central framework. The central framework is driven to rotate, such that the fingers engage the crops and urge the crops toward the cutter bar assembly 210 and the belts. Additionally, the reel may be supported by multiple arms (e.g., reel arms) that are coupled to a frame 201 of the header 200. Each arm of the multiple arms may be coupled to the frame 201 via a respective pivot joint. For example, one pivot joint is configured to enable a first arm of the multiple arms to pivot (e.g., about the lateral axis 140) relative to the frame 201 of to the header 200, and another pivot joint is configured to enable a second arm of the multiple arms to pivot (e.g., about the lateral axis 140) relative to the frame 201 of the header 200.

In the disclosed embodiments, the reel assembly 220 may include an extension assembly (e.g., reel arm extension assembly). In particular, at least one of the multiple arms may be coupled to a bracket (e.g., reel arm extension member) that supports a device. The device may be configured to facilitate detection of terrain features (e.g., a height/position of the crops and/or surface features of the ground) as the harvester 100 travels through the field. For example, the device may be a sensor that is configured to detect the terrain features and to send a signal indicative of the terrain features to an electronic controller for processing. As another example, the device may be a light source (e.g., visible light source) that is configured to illuminate the terrain features to enable detection and visualization by an operator of the harvester 100. In some embodiments, the extension assembly may include both the sensor and the light source coupled to the bracket. Indeed, it should be appreciated that the extension assembly may include any number of devices (e.g., 1, 2, 3, 4, 5 or more) and any of a variety of devices, such as any of a variety of devices that emit electromagnetic waves (e.g., sensors; emitters; light sources), coupled to the bracket. Advantageously, in the disclosed embodiments, the reel assembly 220 is configured to maintain an orientation of the device relative to the frame 201 of the header 200 and relative to the cutter bar assembly 210 as the multiple reel arms move (e.g., pivot about the respective pivot joints) relative to the frame 201 of the header 200.

FIG. 2 is a perspective view of an embodiment of the header 200 that may be employed within the harvester 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., the extent of the header 200 along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at the lateral center of the header 200. However, in other embodiments, the blade support/moving blade assembly may be driven by another suitable mechanism (e.g., located at any suitable position on the header 200). As the harvester 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first lateral belt 202 on a first lateral side of the header 200 and a second lateral belt 203 on a second lateral side of the header 200, opposite the first lateral side. Each belt is driven to rotate by a suitable drive mechanism, such as an electric motor or a hydraulic motor. The first lateral belt 202 and the second lateral belt 203 are driven such that the top surface of each belt moves laterally inward. In addition, the header 200 includes a longitudinal belt 204 positioned between the first lateral belt 202 and the second lateral belt 203 along the lateral axis 140. The longitudinal belt 204 is driven to rotate by a suitable drive mechanism, such as an electric motor or a hydraulic motor. The longitudinal belt 204 is driven such that the top surface of the longitudinal belt 204 moves rearwardly relative to the direction of travel 146.

In the illustrated embodiment, the crops cut by the cutter bar assembly 210 are directed toward the belts at least in part by the reel assembly 220, thereby substantially reducing the possibility of the cut crops falling onto the surface of the field. The reel assembly 220 includes a reel 221 having multiple fingers 222 extending from a central framework 223. The central framework 223 is driven to rotate such that the fingers 222 move (e.g., in a circular pattern). The fingers 222 are configured to engage the crops and urge the cut crops toward the belts. The cut crops that contact the top surface of the lateral belts 202, 203 are driven laterally inwardly to the longitudinal belt 204 due to the movement of the lateral belts 202, 203. In addition, cut crops that contact the longitudinal belt 204 and the cut crops provided to the longitudinal belt 204 by the lateral belts 202, 203 are driven rearwardly relative to the direction of travel 146 due to the movement of the longitudinal belt 204. Accordingly, the belts move the cut agricultural crops through an opening 204 in the header 200 to the inlet 121 of the agricultural crop processing system 120 (FIG. 1).

In the illustrated embodiment, the reel 221 includes multiple sections coupled to one another. In particular, the reel 221 includes a center section 224 (e.g., positioned forward of a center section 205 of the frame 201 of the header 200 relative to the direction of travel 146), a first wing section 225, and a second wing section 226. In the illustrated embodiment, each section of the reel 221 is supported by one or more arms 227 (e.g., reel arms) that are coupled to the frame 201 of the header 200. While the reel 221 includes three sections 224, 225, 226 coupled to the frame 201 of the header 200 via four arms 227, it should be appreciated that the reel 221 may include any number of sections coupled to the frame 201 of the header 200 via any number of arms (e.g., one section coupled to the frame 201 of the header 200 via two arms; two sections coupled to the frame 201 of the header 200 via three arms; four sections coupled to the frame 201 of the header 200 via five arms).

As discussed in detail below, regardless of the number of arms 227, each arm 227 is pivotally coupled to the frame 201 of the header 200 via a respective pivot joint. The pivot joints are configured to enable the arms 227 to pivot (e.g., about the lateral axis 140) relative to the frame 201 of the header 200. An actuator may be coupled to each arm 227 and configured to drive the respective arm 227 to rotate, thereby controlling a position of the reel 221 relative to the frame 201 of the header 200 along the vertical axis 144. Such a configuration may enable the reel 221 to be positioned at an appropriate position along the vertical axis 144 to engage the crops to prepare the crops to be cut by the cutter bar assembly 210 and/or to urge the cut crops toward the belts 202, 203, 204, for example. In some embodiments, each section of the reel 221 may also be configured to slide along its respective arm(s) to enable the reel 221 to move along the longitudinal axis 142 relative to the frame 201 of the header 200. Such a configuration may enable at least a portion of the reel assembly 220 to be positioned forward of the cutter bar assembly 210 relative to the direction of travel 146 to enable the reel assembly 220 to engage the crop to prepare the crop to be cut by the cutter bar assembly 210, for example.

As noted above, the reel assembly 220 may include an extension assembly 250. The extension assembly 250 may include one or more brackets 251 (e.g., reel arm extension) and one or more devices 252 (e.g., sensors, emitters, light sources). The one or more devices 252 may be configured to facilitate detection of terrain features, such as a height/position of the crops and/or surface features of the ground, as the harvester 100 travels through the field. In the illustrated embodiment, each of the arms 227 is coupled to a respective bracket 251 that supports a respective device 252. However, only some of the arms 227 may be coupled to a respective bracket 251 that supports a respective device 252. For example, only the laterally-outer arms 227 may be coupled to a respective bracket 251 and a respective device 252, only the laterally-inner arm(s) 227 may be coupled to a respective bracket 251 and a respective device 252, and/or every other arm 227 (e.g., non-adjacent or alternating arms) may be coupled to a respective bracket 251 and a respective device 252. As discussed in more detail below, regardless of the number of brackets 251 and devices 252 included in the extension assembly 250, an orientation of each device 252 relative to the frame 201 of the header 200 and relative to the cutter bar assembly 210 may be maintained as the reel arms 227 move (e.g., pivot about their respective pivot joints) relative to the frame 201 of the header 200.

Figure 3:
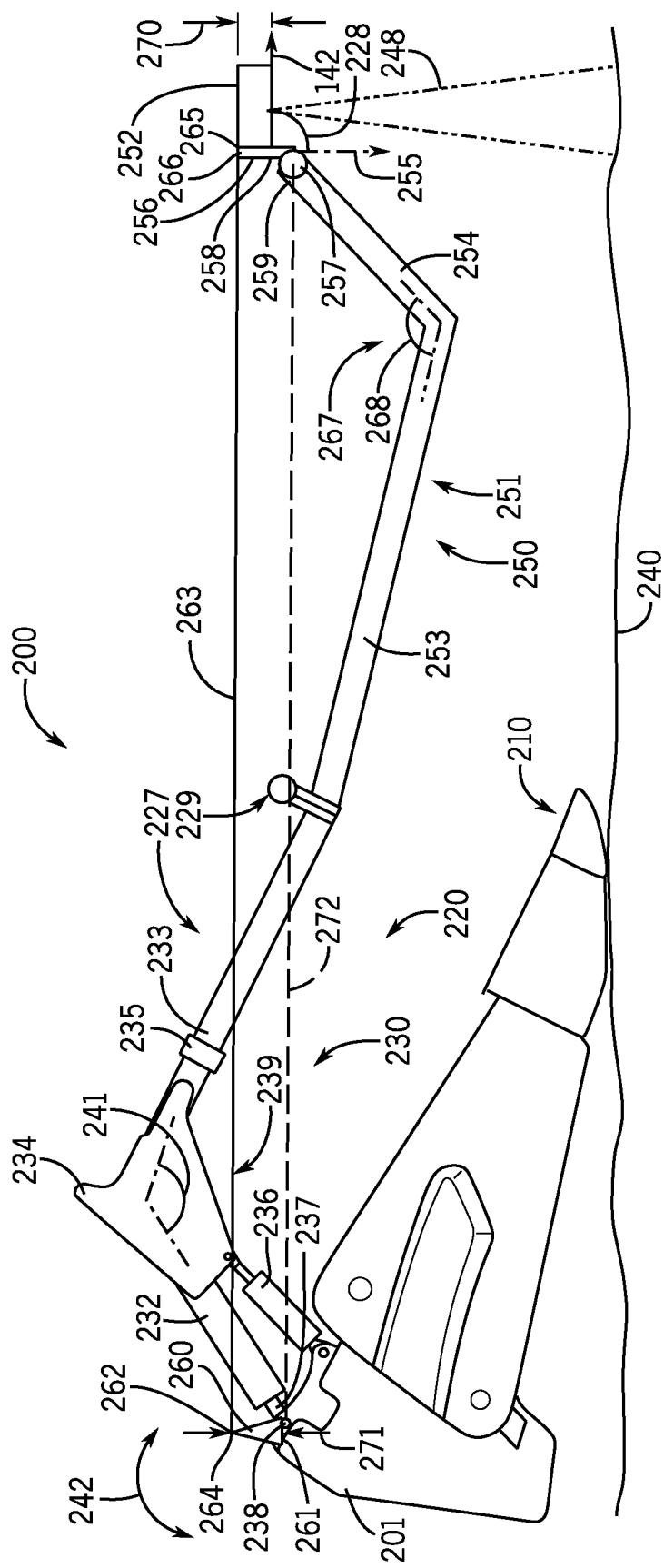
FIG. 3 is a side view of a portion of the header of FIG. 2, in which a reel assembly having a device assembly with a cable is in a first position relative to a frame of the header, in accordance with embodiments of the present disclosure.
Figure 4:
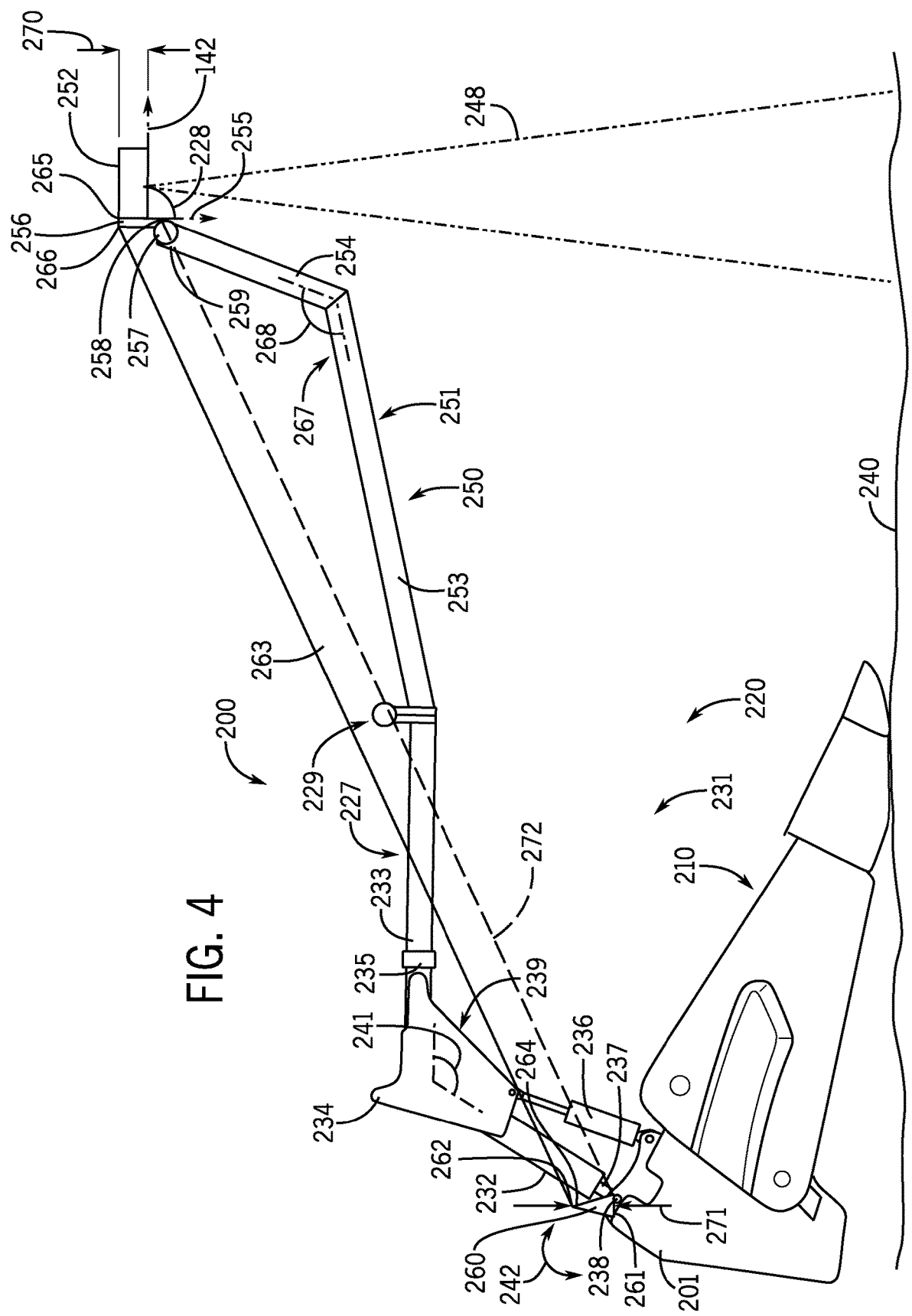
FIG. 4 is a side view of the portion of the header of FIG. 3, in which the reel assembly having the device assembly with the cable is in a second position relative to the frame of the header, in accordance with embodiments of the present disclosure.

FIG. 3 is a side view of a portion of the header 200 with the arm 227 in a first position 230 (e.g., lowered position) relative to the frame 201 of the header 200, and FIG. 4 is a side view of the portion of the header 200 with the arm 227 in a second position 231 (e.g., raised position) relative to the frame 201 of the header 200. The arm 227 includes a first arm portion 232 and a second arm portion 233 that are coupled together (e.g., in a fixed position relative to one another). In the illustrated embodiment, the first arm portion 232 and the second arm portion 233 are coupled together another via one or more plates 234 (e.g., on opposite lateral sides of the arm portions 232, 233), although the first arm portion 232 and the second arm portion 233 may be coupled together via any suitable fasteners (e.g., bolts, pins, welds).

It should be appreciated that the arm 227 may have any of a variety of shapes or configurations. For example, the first arm portion 232 and the second arm portion 233 may be physically separate structures that are coupled together, or the first arm portion 232 and the second arm portion 233 may be formed as a one-piece structure. Furthermore, the arm 227 may be formed from any number of portions (e.g., 1, 2, 3, 4, 5, or more) having any of a variety of dimensions (e.g., lengths). Moreover, the arm 227 may have any number (e.g., 1, 2, 3, 4, 5, or more) of bends and/or the arm portions may be positioned at any of a variety of angles relative to one another. The reel 221 (FIG. 2) may be coupled to the arm 227 via a slide 235 (e.g., carriage) that enables the reel 221 to slide along the second arm portion 233 to move along the longitudinal axis 142 relative to the frame 201 of the header 200. To facilitate discussion and for image clarity, the reel 221 and the other associated components that couple the reel 221 to the arm 227 are omitted in FIGS. 3 and 4.

As shown, an actuator 236 may be controlled (e.g., via an electronic controller and/or manually via an operator) to adjust the arm 227 between the first position 230 and the second position 231. As shown, the actuator 236 extends between the frame 201 of the header 200 and the one or more plates 234, although the actuator 236 may be positioned at any suitable location and may be coupled to any suitable structures (e.g., the first arm portion 232, the second arm portion 233) to drive the arm 227 between the first position 230 and the second position 231.

In the illustrated embodiment, the extension assembly 250 includes the bracket 251 and the device 252, which may have a field of view or detection 248. The bracket 251 includes a first bracket portion 253 and a second bracket portion 254 that are coupled together (e.g., in a fixed position relative to one another). In the illustrated embodiment, the first bracket portion 253 and the second bracket portion 254 are formed as a one-piece structure. However, the first bracket portion 253 and the second bracket portion 254 may be physically separate structures that are coupled together another via any suitable fasteners (e.g., plates, bolts, pins, welds). It should also be appreciated that the bracket 251 may have any of a variety of shapes or configurations. For example, the bracket 251 may be formed from any number of bracket portions (e.g., 1, 2, 3, 4, 5, or more) having any of a variety of dimensions (e.g., lengths). Moreover, the bracket 251 may have any number (e.g., 1, 2, 3, 4, 5, or more) of bends and/or the bracket portions may be positioned at any of a variety of angles relative to one another.

As shown, the bracket 251 is coupled to the arm 227 via a joint assembly 229. The joint assembly 229 may be configured to maintain the bracket 251 and the arm 227 in fixed positions relative to one another as the actuator 236 drives the reel assembly 220 between the first position 230 and the second position 231. As discussed in more detail below, in some embodiments, the joint assembly 229 may also capable of bending so that the bracket 251 can be folded against the arm 227 (e.g., for transport). However, in other embodiments, the joint assembly 229 may be a rigid connection, such that the bracket 251 cannot be folded against the arm 227 via movement at the joint assembly 229. Furthermore, in some embodiments, the arm 227 and the bracket 251 may be formed as a one-piece structure.

The reel assembly 220 may include various features that cause the device 252 to maintain an orientation relative to the frame 201 of the header 200 (and relative to the cutter bar assembly 210) as the arm 227 (and the bracket 251) move relative to the frame 201 of the header 200. In particular, an angle 228 (e.g., device-to-frame angle) may be maintained between an axis 255 (e.g., a central axis) of a device mount 256 that is rigidly mounted to (e.g., in a fixed position relative to) the device 252 and the longitudinal axis 142 of the frame 201 of the header 200. In some embodiments, the axis 255 of the device mount 256 may be oriented to generally align with the vertical axis 144 of the frame 201 of the header 200 and/or may be oriented so that a center axis of electromagnetic waves emitted by the device 252 generally align with the vertical axis 144 of the frame 201 of the header 200. However, the axis 255 of the device mount 256 may be at a different angle relative to the frame 201 of the header 200. For example, the axis 255 may be oriented so that the center axis of the electromagnetic waves emitted by the device 252 generally travel rearwardly or forward relative to the direction of travel 146.

As shown, the device mount 256 is pivotally coupled to the bracket 251 via a first pivot joint 257 (e.g., device mount-to-bracket pivot joint). In particular, an end 258 (e.g., proximal end) of the device mount 256 is pivotally coupled to an end 259 (e.g., distal end) of the bracket 251. An end 237 (e.g., proximal end) of the arm 227 is also pivotally coupled to the frame 201 of the header 200 via a second pivot joint 238 (e.g., arm-to-frame pivot joint). Additionally, a cable mount 260 is coupled to the frame 201 of the header 200. In particular, an end 261 (e.g., proximal end) of the cable mount 260 is rigidly coupled to (e.g., in a fixed position relative to; via one or more fasteners, such as bolts, pins, welds) the frame 201 of the header 200, and an end 262 (e.g., distal end) of the cable mount 260 is pivotally coupled to a cable 263 via a third pivot joint 264 (e.g., cable-to-cable mount pivot joint). The cable 263 extends from the end 262 of the cable mount 260 to an end 265 (e.g., distal end) of the device mount 256, and the cable 263 is coupled to the end 265 of the device mount 256 via a fourth pivot joint 266 (e.g., cable-to-device mount pivot joint). A first distance 270 between the first pivot joint 257 and the fourth pivot joint 266 and a second distance 271 between the second pivot joint 238 and the third pivot joint 264 are approximately equal to one another (e.g., within 1, 2, 3, 4, or 5 percent to account for manufacturing variability). The device mount 256, the cable mount 260, and the cable 263 may be part of a cable link (e.g., cable assembly) that operates to maintain the orientation of the device 252 relative to the frame 201 of the header 200 as the arm 227 rotates relative to the frame 201 of the header 200.

In the illustrated embodiment, the first arm portion 232 and the second arm portion 233 are joined at a bend 239 that faces downwardly (e.g., toward a soil surface 240) and that has an angle 241 (e.g., angle between respective central axes of the first arm portion 232 and the second arm portion 233). Additionally, the first bracket portion 253 and the second bracket portion 254 are joined at a bend 267 that faces upwardly (e.g., away from the soil surface 240, opposite from the bend 239) and that has an angle 268 (e.g., angle between respective central axes of the first bracket portion 253 and the second arm bracket portion 254). As shown, the angles 241, 268 may be approximately equal to one another (e.g., within 1, 2, 3, 4, or 5 percent to account for manufacturing variability). In some embodiments, the angles 241, 268 may be obtuse angles and may be approximately 120, 125, 130, 135, 140, 145, or 150 degrees. In some embodiments, the angles 241, 267 may be between approximately 95-150 degrees, 105 to 140 degrees, or 115 to 130 degrees. In the illustrated embodiment, the portions of the arm 227 and the portions of the bracket 251 have corresponding lengths (e.g., axial lengths, along respective central axes). In particular, a length of the first arm portion 232 is approximately equal to a length of the second bracket portion 254, and a length of the second arm portion 233 is approximately equal to a length of the first bracket portion 253. However, it should be appreciated that the arm 227 and the bracket 251 may have any of a variety of geometries that enable the reel assembly 220 to cause the device 252 to maintain the orientation relative to the frame 201 of the header 200 as the arm 227 moves relative to the frame 201 of the header 200. Indeed, the angles 241, 268 may each be any of a variety of angles and/or may not be approximately equal to one other (e.g., may be substantially different from one another). Furthermore, the portions of the arm 227 and the portions of the bracket 251 may not have corresponding lengths (e.g., may be substantially different from one another).

With the disclosed features, when the arm 227 pivots about the second pivot joint 238 (e.g., as shown by arrows 242) to move between the first position 230 and the second position 231, the device mount 256 pivots about the first pivot joint 257 (e.g., the device mount 256 pivots relative to the bracket 251). The components of the device assembly 250 essentially form a virtual parallel link 272 and operate together as a parallel linkage to maintain the angle 228 between the device mount 256 (and the device 252 coupled thereto) and the frame 201 of the header 200. When the device 252 is a sensor, this configuration may enable the sensor to detect terrain features in a particular region relative to the harvester 100 (e.g., forward of the harvester 100)

regardless of the position of the reel assembly 230 relative to the frame 201 of the header 200, for example. When the device 252 is a light source, maintaining the orientation in this way may enable the light source to illuminate terrain features in a particular region of the soil surface 40 relative to the harvester 100 (e.g., to always illuminate a region forward of the harvester 100), for example.

Figure 5:
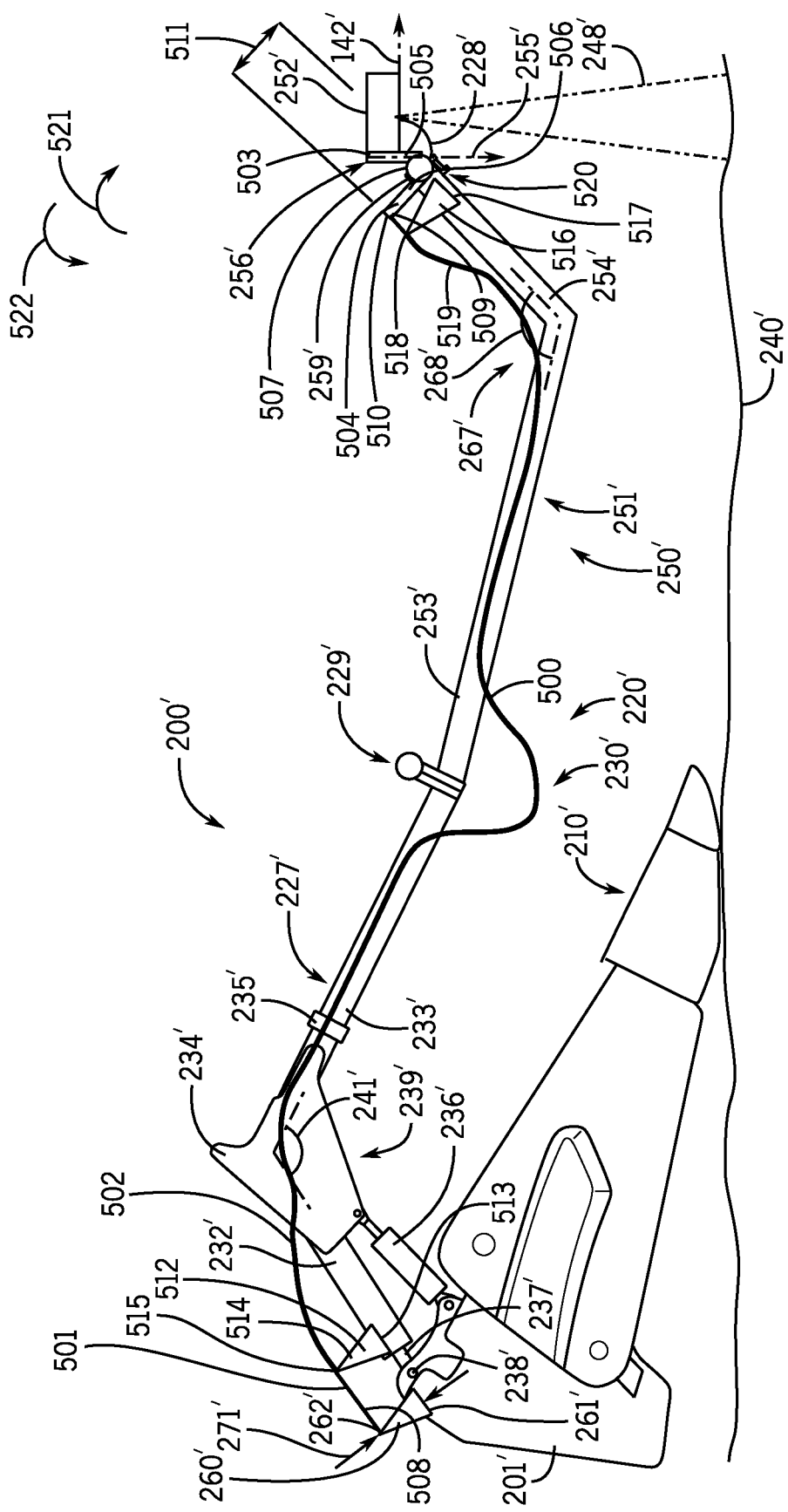
FIG. 5 is a side view of a portion of the header of FIG. 2, in which a reel assembly having a device assembly with a shielded cable is in a first position relative to a frame of the header, in accordance with embodiments of the present disclosure.
Figure 6:
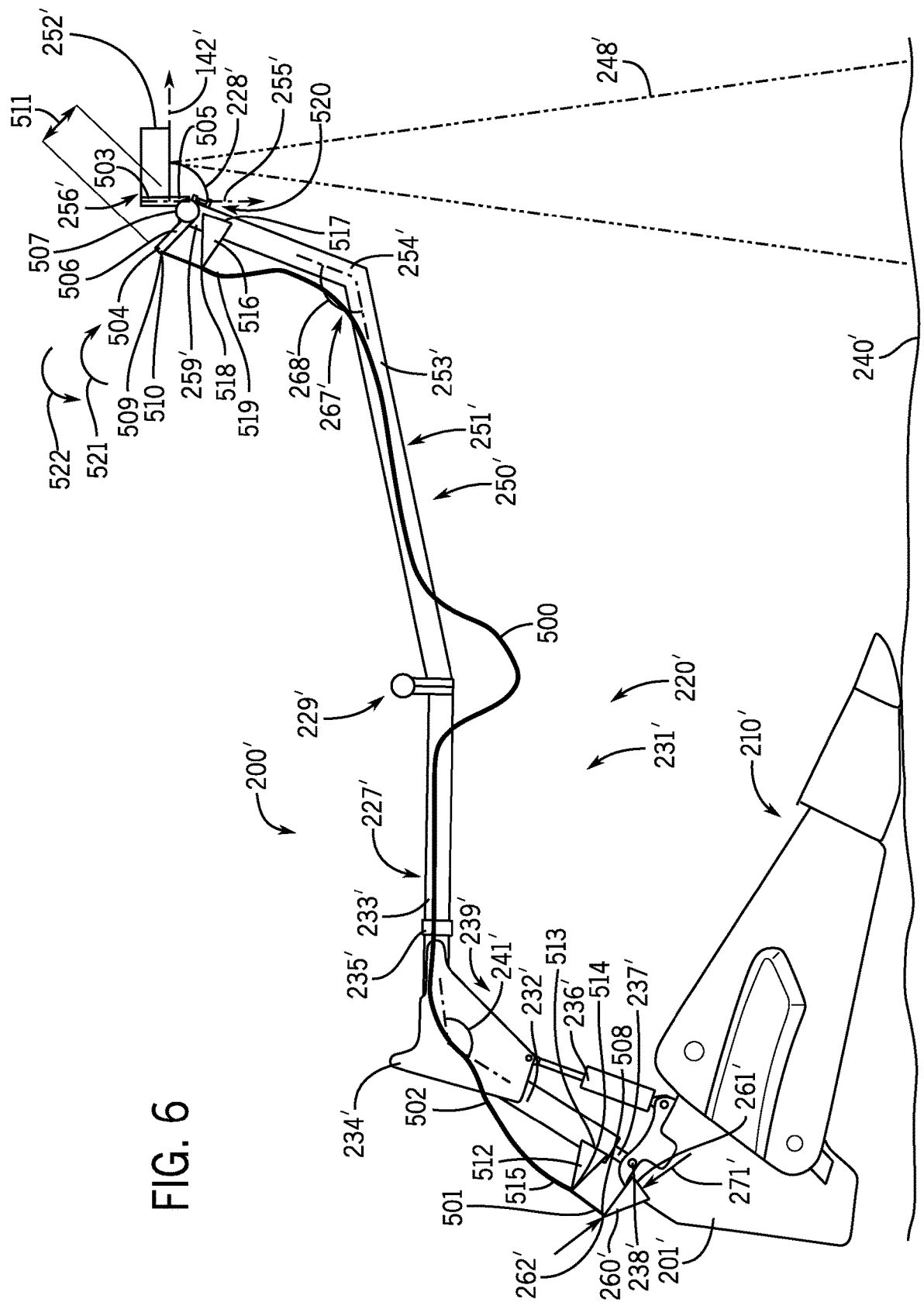
FIG. 6 is a side view of the portion of the header of FIG. 5, in which the reel assembly having the device assembly with the shielded cable is in a second position relative to the frame of the header, in accordance with embodiments of the present disclosure.

It should be appreciated that various other configurations and components may be used to maintain the orientation of the device 252 relative to the frame 201 of the header 200 as the arm 227 moves relative to the frame 201 of the header 200. For example, FIG. 5 is a side view of a portion of the header 200', in which a reel assembly 220' having an extension assembly 250' with a shielded cable 500 (e.g., pull cable) is in a first position 230'. FIG. 6 is a side view of the portion of the header 200', in which the reel assembly 220' having the extension assembly 250' with the shielded cable 500 is in a second position 231'. The shielded cable 500 may include a cable 501 and a cable housing 502 (e.g., shield). The reel assembly 220' and its components shown in FIGS. 5 and 6 may have any of the features of the reel assembly 220 and its components shown and described with respect to FIGS. 1-4. For example, FIGS. 5 and 6 illustrate an arm 227', which may have any of the features of the arm 227 shown and described with respect to FIGS. 3 and 4. FIGS. 5 and 6 also illustrate a bracket 251', which may have any of the features of the bracket 251 shown and described with respect FIGS. 3 and 4.

As shown, the arm 227' (e.g., reel arm) includes a first arm portion 232' and a second arm portion 233' that are coupled together (e.g., in a fixed position relative to one another). In the illustrated embodiment, the first arm portion 232' and the second arm portion 233' are coupled together another via one or more plates 234'. The reel 221' (FIG. 2) may be coupled to the arm 227' via a slide 235' (e.g., carriage) that enables the reel 221' to slide along the second arm portion 233' to move along the longitudinal axis 142' relative to the frame 201' of the header 200'. To facilitate discussion and for image clarity, the reel 221' and the other associated components that couple the reel 221' to the arm 227' are omitted in FIGS. 5 and 6. As shown, the first arm portion 232' and the second arm portion 233' are joined at a bend 239' that faces downwardly (e.g., toward a soil surface 240') and that has an angle 241', although other configuration are envisioned.

An actuator 236' may be controlled (e.g., via an electronic controller and/or manually via an operator) to adjust the arm 227' between the first position 230' and the second position 231'. In the illustrated embodiment, the extension assembly 250' includes the bracket 251' and a device 252'. The bracket 251' includes a first bracket portion 253' and a second bracket portion 254' that are coupled together (e.g., in a fixed position relative to one another). Additionally, the first bracket portion 253' and the second bracket portion 254' are joined at a bend 267' that faces upwardly (e.g., away from the soil surface 240', opposite from the bend 239') and that has an angle 268'.

In the illustrated embodiment, the bracket 251' is coupled to the arm 227' via a joint assembly 229'. The joint assembly 229' may be configured to maintain the bracket 251' and the arm 227' in fixed positions relative to one another as the actuator 236' drives the reel assembly 220' between the first position 230' and the second position 231'. As discussed in more detail below, in some embodiments, the joint assembly 229' may also be capable of bending so that the bracket 251' can be folded against the arm 227' (e.g., for storage and/or transport).

The reel assembly 220' may include various features that cause the device 252' to maintain an orientation relative to the frame 201' of the header 200' (and relative to the cutter bar assembly 210) as the arm 227' (and the bracket 251') moves relative to the frame 201' of the header 200'. In particular, an angle 228' (e.g., sensor-to-frame angle) may be maintained between an axis 255' (e.g., a central axis) of a device mount 256' that is rigidly mounted to (e.g., in a fixed position relative to) the device 252' and the longitudinal axis 142 of the frame 201' of the header 200'.

As shown, the device mount 256' includes a first mounting arm 503 and a second mounting arm 504 that are rigidly coupled to one another (e.g., in a fixed position relative to one another) at their respective ends 505, 506 (e.g., proximal ends) in a v-shaped configuration. The device mount 256' is also coupled to an end 259' (e.g., distal end) of the bracket 251' via a first pivot joint 507 (e.g., device mount-to-bracket pivot joint). An end 237' of the arm 227' is coupled to the frame 201' of the header 200' via a second pivot joint 238' (e.g., arm-to-frame pivot joint).

Additionally, a cable mount 260' is coupled to the frame 201' of the header 200'. In particular, an end 261' (e.g., proximal end) of the cable mount 260' is rigidly coupled to (e.g., in a fixed position relative to; via one or more fasteners, such as bolts, pins, welds) the frame 201' of the header 200'. An end 508 (e.g., proximal end) of the cable 501 is coupled to an end 262' (e.g., distal end) of the cable mount 260 via a third pivot joint 264' (e.g., cable-to-cable mount pivot joint). The cable 501 extends from the end 262' of the cable mount 260' to an end 509 (e.g., distal end) of the device mount 256', and the cable 501 is coupled to the end 509 of the device mount 256' via a fourth pivot joint 510' (e.g., cable-to-device mount pivot joint). A first distance 511 between the first pivot joint 507 and the fourth pivot joint 510 and a second distance 271' between the second pivot joint 238' and the third pivot joint 264' are approximately equal to one another (e.g., within 1, 2, 3, 4, or 5 percent to account for manufacturing variability).

As shown, a first cable housing mount 512 may be coupled to the arm 227'. In particular, an end 513 (e.g., proximal end) of the first cable housing mount 512 is rigidly coupled to (e.g., in a fixed position relative to; via one or more fasteners, such as bolts, pins, welds) the end 237' of the arm 227'. Additionally, an end 514 (e.g., distal end) of the first cable housing mount 512 is coupled to an end 515 (e.g., proximal end) of the cable housing 502. A second cable housing mount 516 may be coupled to the bracket 251'. In particular, an end 517 (e.g., proximal end) of the second cable housing mount 516 is rigidly coupled to (e.g., in a fixed position relative to; via one or more fasteners, such as bolts, pins, welds) the bracket 251'. The second cable housing mount 516 may be coupled to the bracket 251' proximate to the end 259' of the bracket 251'. The second cable housing mount 516 may be coupled to the bracket 251' at a location between the joint assembly 229' and the device mount 256'. Additionally, an end 518 (e.g., distal end) of the second cable housing mount 516 is coupled to an end 519 (e.g., distal end) of the cable housing 502.

Figure 7:
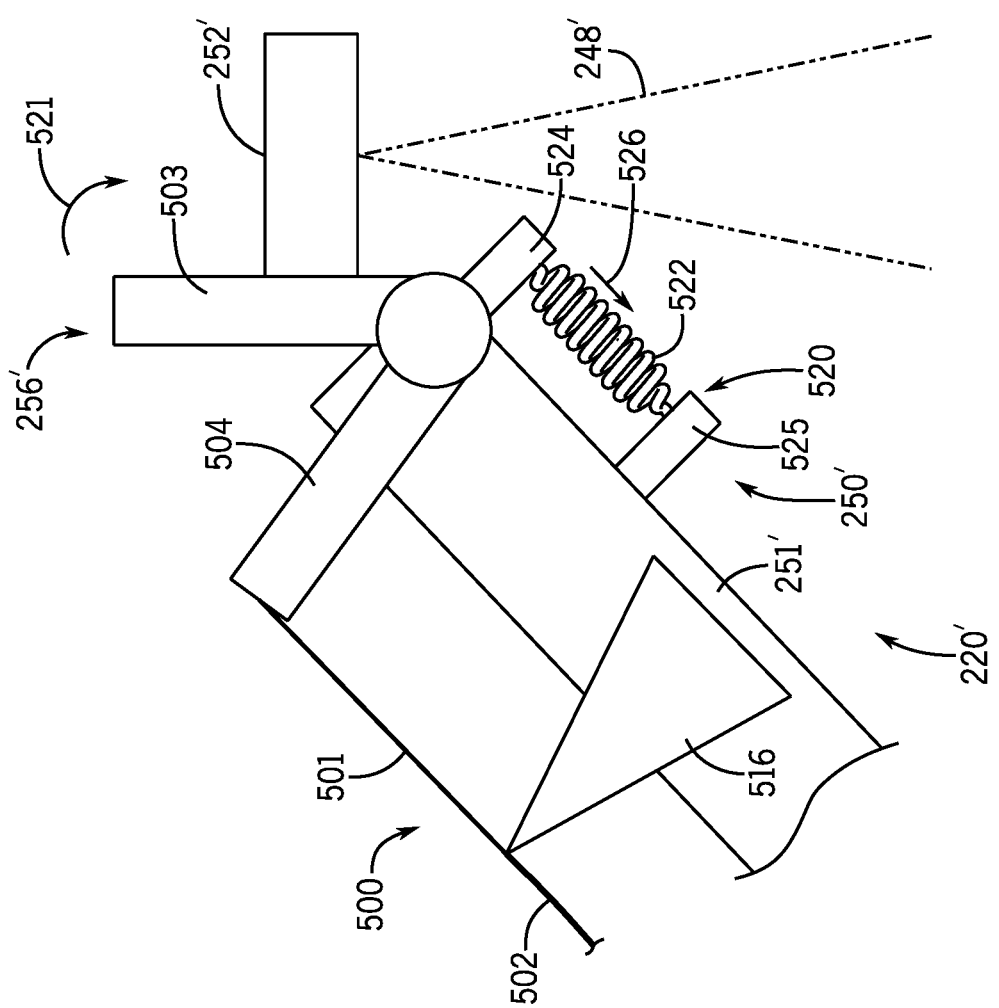
FIG. 7 is a side view of a portion of the device assembly of FIG. 5, in which the device assembly includes a tension biasing member, in accordance with embodiments of the present disclosure.
Figure 8:
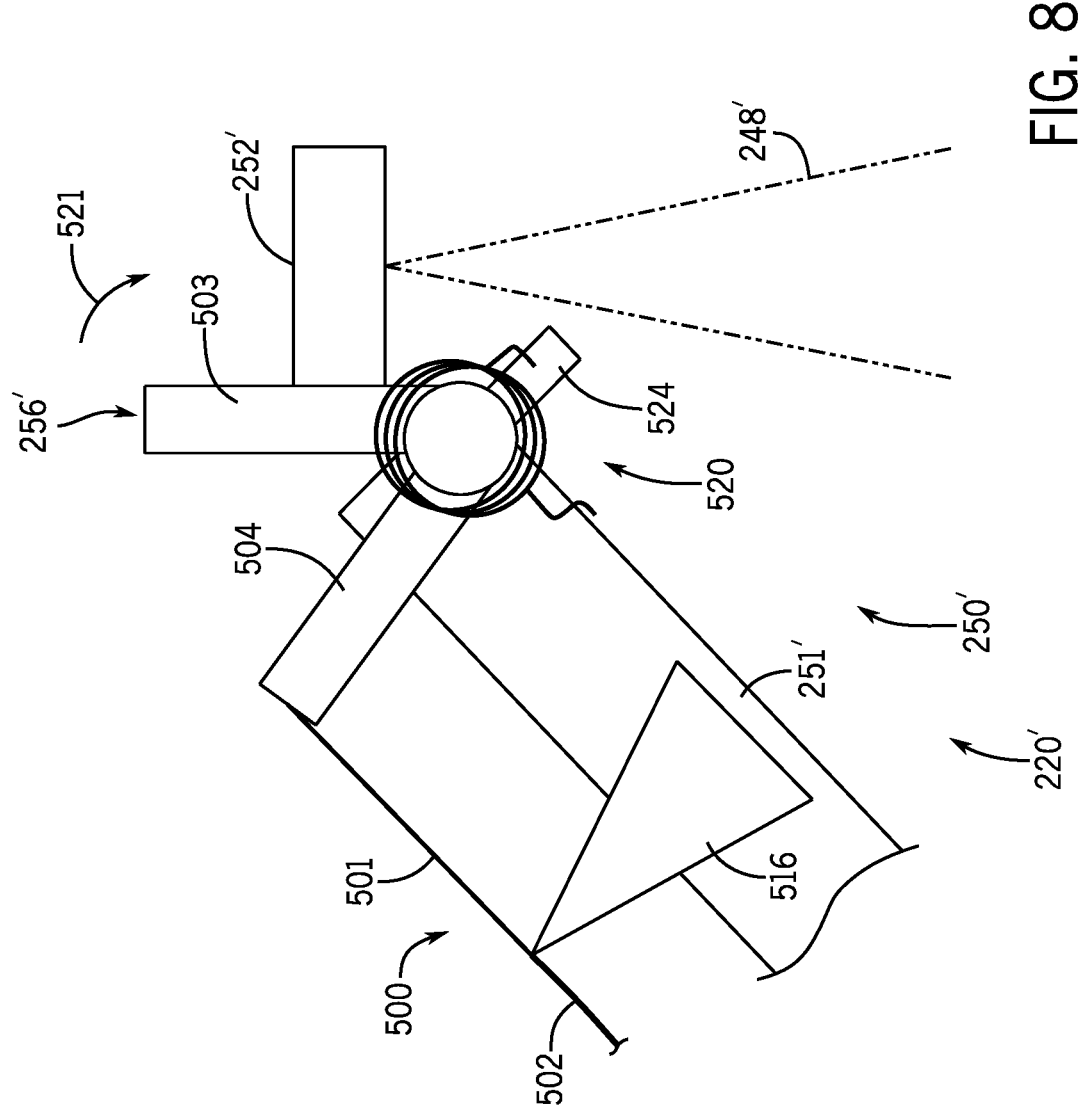
FIG. 8 is a side view of a portion of the sensor assembly of FIG. 5, in which the sensor assembly includes a torsional biasing member, in accordance with embodiments of the present disclosure.

As shown, the device mount 256' may be biased via a biasing assembly 520. In particular, the biasing assembly 520 may bias the device mount 256' so that the mount 256' is biased to pivot away from the header 200, as shown by arrow 521. For example, with reference to FIGS. 7 and 8, the device mount 256' may be biased via a tension spring 522 or a torsion spring 523. In particular, in FIG. 7, the tension spring 522 may drive an extension arm 524 of the device mount 256' toward a base 525 mounted on or formed as part of the bracket 251', as shown by arrow 526. In this way, the tension spring 522 may bias the device mount 256' to pivot away from the header 200', as shown by arrow 521. In FIG. 8, the torsion spring 523 may drive the extension arm 524 of the device mount 256' toward the bracket 251' or may otherwise bias the device mount 256' so that the device 252' is biased to pivot away from the header 200', as shown by arrow 521. The shielded cable 500, the bracket 256', the cable mount 260', the first cable housing mount 512, the second cable housing mount 516, and the biasing assembly 520 may be part of a cable assembly that operates to maintain the orientation of the device 252' relative to the frame 201' of the header 200' as the arm 227' rotates relative to the frame 201' of the header 200'.

In operation, as the arm 227' rotates about the second pivot joint 238' to adjust the arm 227' from the second position 231' to the first position 230' (e.g., to lower the reel assembly 220'), the first cable housing mount 512 moves relative to the first cable mount 260 (e.g., the end 514 moves away from the end 262'). The cable 501 is retracted and overcomes a biasing force of the biasing assembly 520 to pull the device mount 256' and to cause the device mount 256' (and the device 252' mounted thereto) to rotate relative to the bracket 251', as shown by arrow 522. Then, as the arm 227' rotates about the second pivot joint 238' to adjust the arm 227' from the first position 230' to the second position 231' (e.g., to raise the reel assembly 220'), the first cable housing mount 512 moves relative to the first cable mount 260 (e.g., the end 514 moves toward the end 262') and the biasing force exerted by the biasing assembly 520 drives the device mount 256' (and the device 252' mounted thereto) to rotate relative to the bracket 251', as shown by arrow 521. In this way, the reel assembly 220' may maintain an orientation of the device 252' relative to the frame 201' of the header 200' and relative to the cutter bar assembly 210' as the arm 227' moves relative to the frame 201' of the header 200'.

Figure 9:
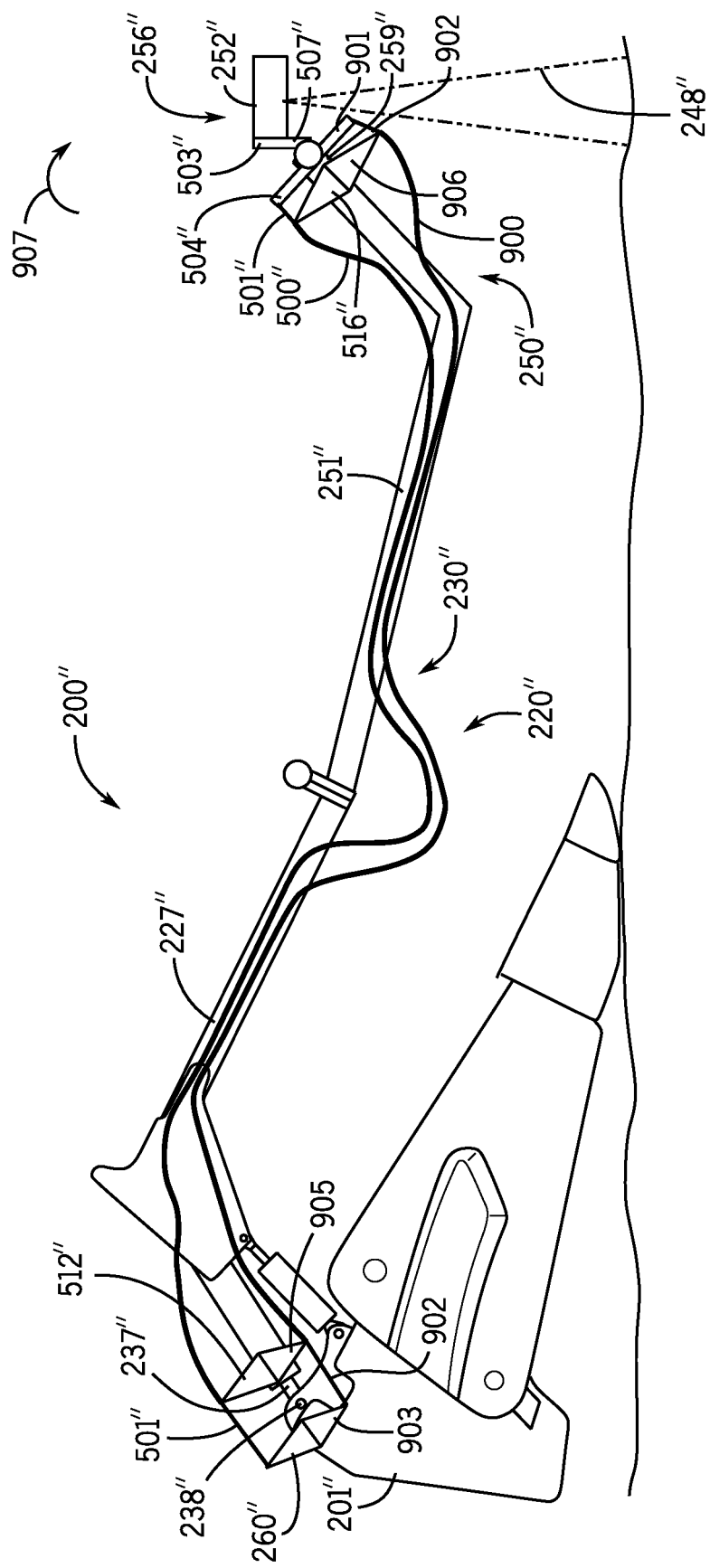
FIG. 9 is a side view of a portion of the header of FIG. 2, in which a reel assembly having a device assembly with two counter-acting cables is in a first position relative to a frame of the header, in accordance with embodiments of the present disclosure.

Various other configurations of the reel assembly 220 are also envisioned. For example, FIG. 9 is a side view of a portion of the header 200", in which a reel assembly 220" having a device assembly 250" with two counter-acting cables (e.g., a first shielded cable 500' and a second shielded cable 900). In FIG. 9, the reel assembly 220" is in a first position 230" relative to a frame 201" of the header 200". The reel assembly 220" and its components shown in FIG. 9 may have any of the features of the reel assembly 220, 220' and its components shown and described with respect to FIGS. 1-8. For example, FIG. 9 illustrates an arm 227", which may have any of the features of the arm 227, 227' shown and described with respect to FIGS. 3-6. FIG. 9 also illustrates a bracket 251", which may have any of the features of the bracket 251, 251' shown and described with respect FIGS. 3-6.

The reel assembly 220" may include various features that cause a device 252" to maintain an orientation relative to the frame 201" of the header 200" (and relative to the cutter bar assembly 210) as the arm 227" (and the bracket 251") moves relative to the frame 201" of the header 200". As shown, the device mount 256' includes a first mounting arm 503" and a second mounting arm 504" that are rigidly coupled to one another (e.g., in a fixed position relative to one another) at their respective ends (e.g., proximal ends) in a v-shaped configuration. The device mount 256" also includes a third mounting arm 901 that is rigidly coupled to (e.g., in a fixed position relative to one another) the first mounting arm 503" and a second mounting arm 504". The mounting arms 503", 504", 901" may be formed as a one piece structure or formed from multiple physically separate structures that are coupled to one another (e.g., in a fixed position relative to one another). As shown, the second mounting arm 504 and the third mounting arm 901 may be coaxial or aligned with one another along an axis. The device mount 256" is also coupled to an end 259" (e.g., distal end) of the bracket 251" via a first pivot joint 507" (e.g., device mount-to-bracket pivot joint).

The first shielded cable 500" may be coupled to the reel assembly 220" as described above with respect to the first shielded cable 500 of FIGS. 5 and 6 (e.g., via the device mount 256", a cable mount 260", a first cable housing mount 512", and a second cable housing mount 516"). However, instead of the biasing assembly 520 of FIGS. 5 and 6, the device assembly 250" includes the second shielded cable 900 and associated components. In particular, a second cable 902 of the second shielded cable 900 may be coupled to the third mounting arm 901 of the device mount 256" and to a second cable mount 903 that is rigidly coupled to (e.g., in a fixed position relative to) the frame 201" of the header 200". Similarly, a second cable housing 904 (e.g., shield) of the second shielded cable 900 may be coupled to a third cable housing mount 905 that is rigidly coupled to (e.g., in a fixed position relative to) the arm 227" and a fourth cable housing mount 906 that is rigidly coupled to (e.g., in a fixed position relative to) the bracket 251".

As the reel arm 227" moves relative to the frame 201" of the header 200", the shielded cables 500, 900 may operate to pull the device mount 256" to adjust the position of the device mount 256" relative to the bracket 251" to maintain an orientation of the device 252" relative to the frame 201" of the header 200". For example, as the arm 227" rotates about the second pivot joint 238" to raise the arm 227" from the first position 230", the second cable 902 is pulled to drive the device mount 256" (and the device 252" mounted thereto) to rotate relative to the bracket 251", as shown by arrow 907. The first shielded cable 500, the second shielded cable 900, the bracket 251", the cable mounts 260", 903, the cable housing mounts 512", 516", 905, 906, and other associated components may be part of a cable assembly that operates to maintain the orientation of the device 252" relative to the frame 201" of the header 200" as the arm 227" rotates relative to the frame 201" of the header 200". It should be appreciated that similar additional components (e.g., an additional cable, an additional cable mount, and an additional device mount) may be incorporated into the reel assembly 220 of FIGS. 3 and 4 in a similar manner to form a parallel linkage that maintains the orientation of the device 252.

In FIGS. 1-4, the reel assembly 220 is in an unfolded position (e.g., extended position; working position) in which the bracket 251 extends forward of the cutter bar assembly 210 relative to the direction of travel. Similarly, in FIGS. 5 and 6 the reel assembly 220' is in the unfolded position. The reel assembly 220'" is also in the unfolded position in FIG. 9. As noted above, in some embodiments, the reel assembly may include the joint that is capable of bending so that the bracket can fold against the arm (e.g., for storage and/or transport).

With the foregoing in mind, FIG. 10 is a side view of a portion of the header 200' of FIG. 5, in which the reel assembly 220' is in a folded position 1000 (e.g., more compact position; storage position; transport position). As shown, the joint assembly 229' couples the arm 227' to the bracket 251', and the joint assembly 229' includes a pivot or hinge joint that enables the bracket 251' to rotate up and over the arm 227' (e.g., up along the vertical axis 144 relative to the ground 140 and rearwardly relative to the direction of travel 146). Thus, the joint assembly 229' enables the bracket 251' to rotate in the direction of arrow 1001. An axis of rotation 1002 may be offset relative to respective central axes of the second arm portion 233' and the first bracket portion 253' during operation of the reel assembly 220'' (e.g., in the unfolded position of FIG. 5) to facilitate such motion of the bracket 251' relative to the arm 227. For example, as shown, the axis of rotation 1002 is positioned vertically above a central axis 1003 of the second arm portion 233' along the vertical axis 144 relative to the ground 140.

In the illustrated embodiment, the joint assembly 229' includes a first member 1004 positioned at an end 243' (e.g., distal end) of the arm 227' and a second member 1005 positioned at an end 274' (e.g., proximal end) of the bracket 251'. The first member 1004 is rigidly coupled to (e.g., in a fixed position relative to) the arm 227' and the second member 1005 is rigidly coupled to (e.g., in a fixed position relative to) the bracket 251'. The first member 1004 and the second member 1005 extend vertically above the arm 227' and the bracket 251', and are pivotally joined (e.g., hinged) to one another at their respective ends to form the joint assembly 229'.

While the first member 1004 is shown as a component that is physically separate from and joined to the arm 227', and while the second member 1005 is shown as a component that is physically separate from and joined to the bracket 251', it should be appreciated that the first member 1004 and the arm 227' may be formed as a one-piece structure and/or the second member 1005 and the bracket 251' may be formed as a one-piece structure. The first member 1004 and the second member 1005 may enable the bracket 251' to avoid other parts of the reel assembly 220' in the folded position 1000, for example. As shown, the shielded cable 500 may have enough slack (e.g., length) to enable the reel assembly 220' to be folded to the folded position 1000. In the unfolded position the device 252' may be positioned forward of the reel 221' relative to the direction of travel 146, and in the folded position 1000, the device 252' may be positioned rearward of the reel 221' relative to the direction of travel 146.

In some embodiments, a weight of the device assembly 250' and the configuration of the joint assembly 229' (e.g., an angle of the first member 1004 and the second member 1005 relative to one another; the position of the hinge of the joint assembly 229' vertically above the respective central axes) may maintain the reel assembly 220' in the unfolded position as the harvester 100 travels through the field. In some embodiments, the joint assembly 229' may include a lock (e.g., electrical lock; mechanical lock) that maintains the reel assembly 220' in the unfolded position when the lock is in a locked position. The reel assembly 220' may be folded by unlocking the lock and/or by exerting a force on the bracket 251' to direct the bracket 251' to rotate about the axis of rotation 1002 of the joint assembly 229'. Additionally, it should be appreciated that the reel assembly 200 of FIGS. 2-4 and the reel assembly 220'' of FIG. 9 may be folded to reach the folded position in the same way.

As noted above, the bracket may support any number of devices (e.g., 1, 2, 3, 4, 5 or more) and any of a variety of devices, such as any of a variety of devices that emit electromagnetic waves (e.g., sensors; emitters; sources of visible light). For example, the device may be replaced by any other type of device, such as a source of visible light. Furthermore, the device and one or more additional devices, such as a source of visible light, may be rigidly coupled to (e.g., in a fixed position relative to) the device mount disclosed herein. In such cases, the device and the one or more additional devices may each maintain their respective orientation relative to the frame of the header as the arms move relative to the frame of the header.

Additionally, as shown in FIG. 11, a source of visible light 1100 may be positioned along the bracket 251 of the reel assembly 220. The source of visible light 1100 may be positioned along the first bracket portion 253 and/or may be oriented to direct light rearwardly (e.g., relative to the direction of travel 146) and downwardly (e.g., toward the ground). Such a configuration may enable the source of visible light 1100 to illuminate at least a portion of the cutter bar assembly 210 and/or at least a portion of the reel assembly 220. However, it should be appreciated that the source of visible light 1100 may be positioned at any of a variety of locations along the bracket 251 and/or may have any of a variety of orientations. Furthermore, multiple sources of visible light and/or other devices may be positioned at any of a variety of locations along the bracket 251 and may have any of a variety of orientations relative to the bracket 251. The source of visible light 1100 may be utilized in combination with any other features disclosed herein (e.g., with the device and the cable assembly shown in any of FIGS. 3-9).

It should also be appreciated that any of the devices disclosed herein (e.g., the device 252, 252', 252'', the source of visible light 1100, and any other device) may include a power source (e.g., battery) and/or may be coupled to a power source (e.g., via a power cable). Furthermore, these components may be coupled to an electronic controller having a processor and a memory. The electronic controller may control operation of the device and/or processes signals received from the device. For example, the electronic controller may control operation of the device and may also receive signals from the device. The processor may process the signals to determine the terrain features, such as a presence of rocks on the ground and/or a height of the crops, and then may provide control signals to adjust the cutter bar assembly to an appropriate height based on the terrain features, for example. In such cases, the processor may be any suitable type of computer processor or microprocessor capable of executing computer-executable code. The processor may also include multiple processors that may perform the operations described herein. The memory may represent non-transitory computer-readable media (e.g., any suitable form of memory or storage) that may store the processor-executable code used by the processor to perform various techniques described herein. It should be noted that non-transitory merely indicates that the media is tangible and not a signal.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A reel assembly for an agricultural header, comprising:
a reel arm configured to rotatably couple to a frame of the agricultural header and configured to support a reel of the reel assembly;
a bracket extending from the reel arm and configured to support a device, wherein the device is rotatably coupled to the bracket; and
a cable assembly coupled to the device and the frame and configured to drive rotation of the device relative to the bracket to maintain an orientation between the device and the frame of the agricultural header as the reel arm rotates relative to the frame of the agricultural header.

2. The reel assembly of claim 1, wherein the device comprises a source of visible light.

3. The reel assembly of claim 1, wherein the device comprises a sensor that is configured to detect a terrain feature.

4. The reel assembly of claim 1, wherein the cable assembly comprises:
a cable mount that extends from a first cable mount end to a second cable mount end, wherein the first cable mount end is rigidly coupled to the frame of the agricultural header and the second cable mount end is rotatably coupled to a cable; and
a device mount rigidly coupled to the device and that extends from a first device mount end to a second device mount end, wherein the first device mount end is rotatably coupled to the bracket and the second device mount end is rotatably coupled to the cable.

5. The reel assembly of claim 1, wherein the reel arm is coupled to the bracket via a joint assembly that enables the reel assembly to adjust from an unfolded position in which all of the bracket is positioned forward of the reel arm relative to a direction of travel to a folded position in which at least a portion of the bracket is not positioned forward of the reel arm relative to the direction of travel.

6. The reel assembly of claim 5, wherein the joint assembly enables the bracket to fold vertically upwardly relative to a ground surface and rearwardly relative to the direction of travel to reach the folded position.

7. The reel assembly of claim 1, wherein the cable assembly comprises a shielded cable.

8. An assembly for an agricultural header, comprising:
a bracket configured to extend from a reel arm of an agricultural header;
a device rotatably coupled to the bracket, wherein the device is configured to emit electromagnetic waves to facilitate monitoring a terrain feature forward of a cutter bar assembly of the agricultural header; and
a cable assembly coupled to the device and a frame of the agricultural header and configured to drive rotation of the device relative to the bracket to maintain an orientation between the device and the frame of the agricultural header as the reel arm rotates relative to the frame of the agricultural header.

9. The assembly of claim 8, wherein the device comprises:
a source of visible light that is configured to emit the electromagnetic waves to illuminate the terrain feature;
a sensor that is configured to emit the electromagnetic waves to detect presence of the terrain feature, characteristics of the terrain feature, or both; or
any combination thereof.

10. The assembly of claim 8, wherein the cable assembly comprises:
a cable mount that extends from a first cable mount end to a second cable mount end, wherein the first cable mount end is configured to rigidly couple to the frame of the agricultural header and the second cable mount end is rotatably coupled to a cable; and
a device mount rigidly coupled to the device and that extends from a first device mount end to a second device mount end, wherein the first device mount end is rotatably coupled to the bracket and the second device mount end is rotatably coupled to the cable.

11. The assembly of claim 8, comprising a joint assembly that is configured to rotatably couple the bracket to the reel arm to enable the bracket to move between an unfolded position and a folded position relative to the reel arm.

12. The assembly of claim 8, wherein the cable assembly comprises a shielded cable.

13. A header for an agricultural harvester, comprising:
a cutter bar assembly coupled to a frame of the agricultural header and configured to cut crops as the agricultural harvester travels through a field;
a reel arm coupled to the frame of the agricultural header and configured to support a reel of a reel assembly that rotates to prepare the crops to be cut by the cutter bar assembly as the agricultural harvester travels through the field;
a bracket coupled to the reel arm and configured to support a sensor that is configured to detect terrain features as the agricultural harvester travels through the field, wherein the sensor is rotatably coupled to the bracket; and
a cable assembly coupled to the sensor and the frame and configured to drive rotation of the sensor relative to the bracket to maintin an orientation between the sensor and the frame of the agricultural header as the reel arm rotatese relative to the frame of the agricultural header.

14. The header of claim 13, wherein the bracket is configured to position the sensor forward of the cutter bar assembly relative to a direction of travel of the agricultural harvester.

15. The header of claim 13, comprising a source of visible light coupled to the bracket.

16. The header of claim 13, wherein the cable assembly comprises a shielded cable.

17. The reel assembly of claim 1, wherein the cable assembly comprises a cable coupled to the device and the frame.

* * * * *